United States Patent
Feistritzer et al.

(10) Patent No.: US 8,863,502 B2
(45) Date of Patent: Oct. 21, 2014

(54) METERING MODULE FOR A LIQUID REDUCING AGENT

(75) Inventors: Bernhard Feistritzer, Pfarrwerfen (AT); Markus Foetschl, Unternberg (AT); Werner Pape, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 13/391,803

(22) PCT Filed: Jul. 29, 2010

(86) PCT No.: PCT/EP2010/061000
§ 371 (c)(1),
(2), (4) Date: Feb. 22, 2012

(87) PCT Pub. No.: WO2011/032767
PCT Pub. Date: Mar. 24, 2011

(65) Prior Publication Data
US 2012/0160937 A1    Jun. 28, 2012

(30) Foreign Application Priority Data

Sep. 15, 2009   (DE) .......................... 10 2009 029 473

(51) Int. Cl.
*F01N 3/10*    (2006.01)
*F01N 3/20*    (2006.01)

(52) U.S. Cl.
CPC ....... *F01N 3/2066* (2013.01); *F01N 2610/1453* (2013.01); *Y02T 10/24* (2013.01); *F01N 2610/08* (2013.01); *F01N 2610/02* (2013.01)
USPC ................. 60/295; 60/289; 60/293; 239/403; 239/434.5

(58) Field of Classification Search
USPC ............ 60/286, 289, 293, 295; 239/399, 432, 239/433, 434, 434.5, 403
See application file for complete search history.

(56) References Cited

U.S. PATENT DOCUMENTS

| | | | |
|---|---|---|---|
| 4,842,197 A * | 6/1989 | Simon et al. | ....................... 239/5 |
| 5,035,358 A * | 7/1991 | Katsuno et al. | ............... 239/403 |
| 5,605,042 A | 2/1997 | Strutzenberger | |

(Continued)

FOREIGN PATENT DOCUMENTS

| | | |
|---|---|---|
| CA | 2221340 | 11/1996 |
| DE | 102006037123 | 2/2008 |
| DE | 102007020965 | 11/2008 |
| WO | 2008135332 | 11/2008 |

OTHER PUBLICATIONS

PCT/EP2010/061000 International Search Report and Written Opinion.

*Primary Examiner* — Jesse Bogue
*Assistant Examiner* — Jorge Leon, Jr.
(74) *Attorney, Agent, or Firm* — Michael Best & Friedrich LLP

(57) ABSTRACT

The present invention relates to a metering module (15) for a liquid reducing agent, in particular a urea-water solution, for mixing the reducing agent with a gas, in particular air, for further introduction into an exhaust pipe (5) of an internal combustion engine (1). The metering module (15) comprises a metering valve (31) having a conduit (33), a compressed air duct (49) and a mixing chamber (35). An outlet opening of the conduit (33) for the reducing agent is arranged in the mixing chamber (35) at a distance from the mid-axis of the metering module (36).

12 Claims, 4 Drawing Sheets

(56) References Cited

U.S. PATENT DOCUMENTS

| | | | |
|---|---|---|---|
| 5,826,798 A * | 10/1998 | Schindler et al. | 239/403 |
| 6,199,566 B1 * | 3/2001 | Gazewood | 134/166 C |
| 6,991,183 B2 * | 1/2006 | Nau et al. | 239/290 |
| 7,100,366 B2 | 9/2006 | Hager et al. | |
| 8,356,473 B2 | 1/2013 | Blomquist et al. | |
| 2002/0125336 A1 * | 9/2002 | Bretz | 239/8 |
| 2003/0098360 A1 * | 5/2003 | Aggarwal | 239/8 |
| 2003/0146301 A1 * | 8/2003 | Sun et al. | 239/399 |
| 2008/0302089 A1 * | 12/2008 | Way et al. | 60/286 |
| 2009/0031714 A1 | 2/2009 | Jochumsen et al. | |
| 2010/0122521 A1 * | 5/2010 | Sun et al. | 60/284 |

* cited by examiner

METERING MODULE FOR A LIQUID REDUCING AGENT

BACKGROUND OF THE INVENTION

The invention relates to a dosing module for a liquid reducing agent, in particular a urea-water solution, for mixing the reducing agent with a gas, in particular air, for onward introduction into an exhaust pipe of an internal combustion engine, the dosing module comprising a dosing valve with a guide tube, comprising a compressed-air duct and comprising a mixing chamber.

The emissions limit values stipulated by the legislators for nitrogen oxides make it necessary to provide in motor vehicles exhaust-gas aftertreatment devices which perform for example a selective catalytic reduction (SCR) of the nitrogen oxides contained in the untreated emissions of the internal combustion engine. Said so-called SCR process for exhaust-gas purification is known from the prior art.

An example of an exhaust-gas aftertreatment device of said type is known from WO 02/07916 A1. In said document, in a dosing module, using a reducing agent, preferably a urea-water solution, to be introduced into the exhaust gases, the liquid reducing agent and additionally compressed air are introduced into a mixing chamber via a dosing valve. In the mixing chamber, there is formed from these a reducing agent-air mixture which is introduced into the exhaust pipe.

The dosing module comprises the dosing valve and the mixing chamber, wherein the mixing chamber is conventionally arranged in a housing composed of corrosion-resistant steel, in which is inserted a profiled seal composed of an elastomer, for example "fluorosilicone". The seal serves as a check valve, such that the compressed air can pass into the mixing chamber but as far as possible no urea-water solution can pass into the compressed-air region. Said delimitation is necessary because, firstly, in the event of drying of the urea-water solution, urea crystals can be precipitated which can lead to a blockage of a compressed-air line, and secondly, the urea-water solution may, as a result of a possible separation of ammonia, have a highly corrosive effect on parts in the air system.

Furthermore, urea crystals may form on an outer side of the guide pipe at the outlet region during operation as a result of urea-water solution spray. Said urea crystals may dissolve again in urea-water solution. If this does not occur, the urea crystals consequently grow along the guide tube in the direction of the profiled seal and may, over the course of time, fill up significant parts of a compensating region. The resistance for the inflowing air is thereby increased such that failure of the system may occur.

SUMMARY OF THE INVENTION

It is an object of the invention to further develop a dosing module of the type mentioned in the introduction, in which a crystallization of the urea on the outside of the guide tube is prevented. At the same time, the reliability and service life of the dosing module should be increased.

The object is achieved according to the invention in that an outlet opening of the guide tube for the reducing agent is arranged in the mixing chamber so as to be spaced apart from a central axis of the dosing module. In this way, it is for example possible for the outlet opening for the reducing agent to be situated in the vicinity of an inner wall of the mixing chamber above a mixing chamber base, and/or to be situated in the vicinity of an inner wall of the mixing chamber, as a result of which the injected urea-water solution can wet a mixing chamber surface as completely as possible where corresponding adhesion forces may act. The invention is based on the concept of a possible region for the crystallization of the urea crystals being kept wetted with urea-water solution continuously, or at least at short time intervals, by means of a suitable geometry of the device, such that at least in the critical region of the outlet opening at the free end of the guide tube and in the critical region of an air inlet opening, crystallization is not possible and any crystals that may be formed are quickly dissolved again. Crystallization is possible only after drying of the urea-water solution. Furthermore, by means of a suitable design of the guide tube and the installation position of the dosing module, as large a region in the mixing chamber as possible can be wetted with urea-water solution continuously or at least at short time intervals. The invention is therefore cost-effective and ensures reliable operation of the dosing module because the basic function of the dosing module remains unchanged. In particular, the service life of the dosing module is increased because the volume of the mixing chamber is no longer reduced over the course of time by the crystal formation, and/or the function of the profiled seal is no longer impaired by crystal formation.

It is advantageous for the invention if the guide tube is angled relative to the central axis of the dosing module at least in the region of an outlet for the reducing agent. The outlet opening is therefore positioned close to the inner wall of the mixing chamber. In this way, the injected urea-water solution is reflected for example on the mixing chamber base, as a result of which the entire inner surface of the mixing chamber is wetted. This may be further assisted by virtue of the guide tube being produced from Teflon or from another fluoroplastic, that is to say from a material with a very low surface tension, and by virtue of the guide tube being designed so as to open conically in the direction of the outlet opening. As a result of the enlargement of the outlet opening, a larger region of the mixing chamber can be wetted by urea-water solution. If a bush for guiding the guide tube is produced together with the guide tube from Teflon or from some other fluoroplastic with a very low surface tension, migration of the urea-water solution into the air inlet region as a result of creep processes is actively prevented. A coating only of the inner surface and/or of the outer surface of the bush with Teflon or some other fluoroplastic is also possible.

It is alternatively also possible for the guide tube to be closed off in the manner of a trough at the free end and to have a lateral outlet opening for the reducing agent. Here, at least a part of the guide tube may be offset in the direction of an inner wall of the mixing chamber, and the arranged outlet opening points in the direction of the inner wall. The urea-water solution injected by the dosing module is deflected on the trough-shaped end of the guide tube and is distributed via the lateral outlet opening over the entire mixing chamber, the surface of which is therefore completely wetted.

If the mixing chamber is of conical design directly above the dosing line which leads into the exhaust pipe, it is also advantageously ensured in this way that always all of the urea-water solution can flow out of the mixing chamber into the dosing line.

To prevent an accumulation of urea-water solution spray for example in the compressed-air duct of the dosing module, it is proposed that a diameter of the compressed-air duct is smaller than a diameter of the guide tube. The guide tube should be larger than the diameter of the compressed-air duct by at least the factor 1.1. It is also advantageous here for the compressed-air duct to additionally be narrowed in the middle. The compressed-air duct should be formed with a diameter so small that firstly a resistance for the air flow has no adverse effect on the system function of the dosing module, and secondly the air flow in the duct is so great that possible crystals or adherent urea-water solution in the air duct can be blown out. The narrowing in the compressed-air duct assists this action. If the air duct is produced from Teflon or from some other fluoroplastic, migration as a result of creep processes of urea-water solution into the region of the air inlet is prevented.

In another embodiment of the dosing module, it is particularly advantageous for the compressed-air duct to comprise a check valve, in particular a spring-loaded ball valve. Here, the check valve may be provided in a lateral air inlet region in the housing of the dosing module, and has the task of preventing an exchange of gases between the interior of the dosing valve and the external compressed-air system when the system is at a standstill. Here, the air inlet may be arranged directly above a screw connection of the dosing module, such that it is advantageously possible to dispense with the hitherto conventional profiled seal with the sealing lip which acts as a check valve. It is also possible to dispense with the discrete mixing chamber or for the latter to at least be considerably reduced in size, since the urea/water-air mixture can also be formed in the region of the guide tube. This reduces the structural length of the dosing module considerably and— also as a result of simpler production—additionally saves on production costs.

If, in said embodiment, the bush in which the guide tube is guided is designed such that it keeps the urea-water solution at bay as far as the screw connection, it is also possible for a cheaper material than has hitherto been conventional to be used for the housing of the dosing module (aluminum alloys or plastic, for example), because said material need not be resistant to the aggressive urea-water solution. This, too, reduces the production costs.

The prevention of the crystallization of urea-water solution in the dosing module is further promoted if the mixing chamber is deaerated when the system is switched off. During the switching-off of the system, the dosing valve and a ventilation valve which is situated in the line between the urea-water solution and the dosing module is opened in order to lower a mixing chamber pressure to an ambient pressure for a sufficient amount of time. The dosing valve may also be arranged outside the dosing module. Here, while the mixing chamber pressure is lowered, residues of the urea-water solution in the dosing line are forced into the guide tube and are removed from the dosing module via the dosing valve. This may be achieved by means of a change of the software for controlling the dosing module.

BRIEF DESCRIPTION OF THE DRAWINGS

Exemplary embodiments of the invention will be explained by way of example below on the basis of the figures, in which.

DETAILED DESCRIPTION

Figure 1:
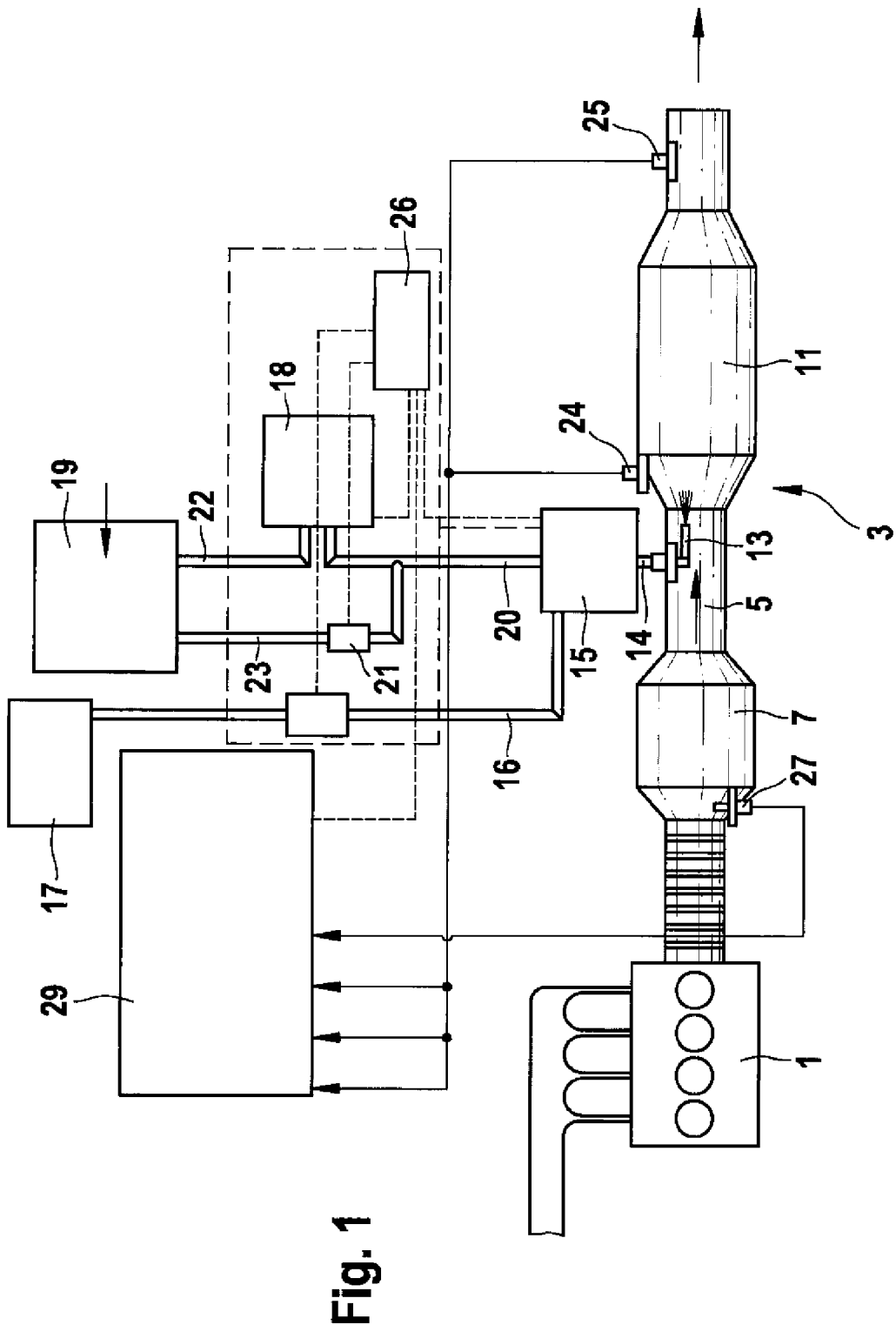
FIG. 1 shows a schematic illustration of an internal combustion engine having an exhaust-gas aftertreatment device.

FIG. 1 shows a highly simplified and schematic illustration of an internal combustion engine 1 having an exhaust-gas aftertreatment device 3. The exhaust-gas aftertreatment device 3 comprises an exhaust pipe 5, an oxidation catalytic converter 7 and an SCR catalytic converter 11. Not illustrated is a particle filter, which is conventionally arranged downstream of the oxidation catalytic converter 7. The flow direction of the exhaust gas through the exhaust pipe 5 is indicated by arrows (without reference numeral).

To supply a reducing agent, for example a urea-water solution or some other reducing agent, to the SCR catalytic converter 11, a spray pipe 13 for the urea-water solution is arranged on the exhaust pipe 5 upstream of the SCR catalytic converter 11. By means of compressed air, the spray pipe 13 sprays the urea-water solution into the exhaust pipe 5 upstream of the SCR catalytic converter 11 on demand. The spray pipe 13 is connected to the dosing module 15 via a dosing line 14. For this purpose, a pressure line 16 for supplying compressed air from a compressed-air generating unit 17 or from a compressed-air tank is provided on the dosing module 15.

Aside from the spray pipe 13, the dosing line 14 and the dosing module 15, the entire dosing system comprises a dosing pump 18 and a storage tank 19 for the urea-water solution. Provided between the dosing pump 18 and the dosing module 15 is a first line (reducing agent feed line) 20. The dosing system additionally comprises a deaeration valve 21. The deaeration valve 21 may also be integrated in the dosing module 15. A second line 22 is provided between the storage tank 19 and the dosing pump 18.

A return line 23 with the deaeration valve 21 branches off from the first line 20. Excess urea-water solution is recirculated into the storage tank 19 via the return line 23. The return line 23 could self-evidently also branch off from the dosing module 15 or the dosing pump 18.

For completeness, reference is also made to the sensors arranged in the exhaust system, specifically a nitrogen oxide sensor 25 and temperature sensors 24 and 27. Said sensors 24, 25 and 27 are connected via signal lines (without reference numeral) to a control unit 29 of the internal combustion engine 1. The control unit 29 controls the internal combustion engine 1 and sends data to and receives data from the control unit 26 of the dosing system. The signal connections from and to the control unit 26 of the dosing system are illustrated in FIG. 1 by dashed lines.

Figure 2:
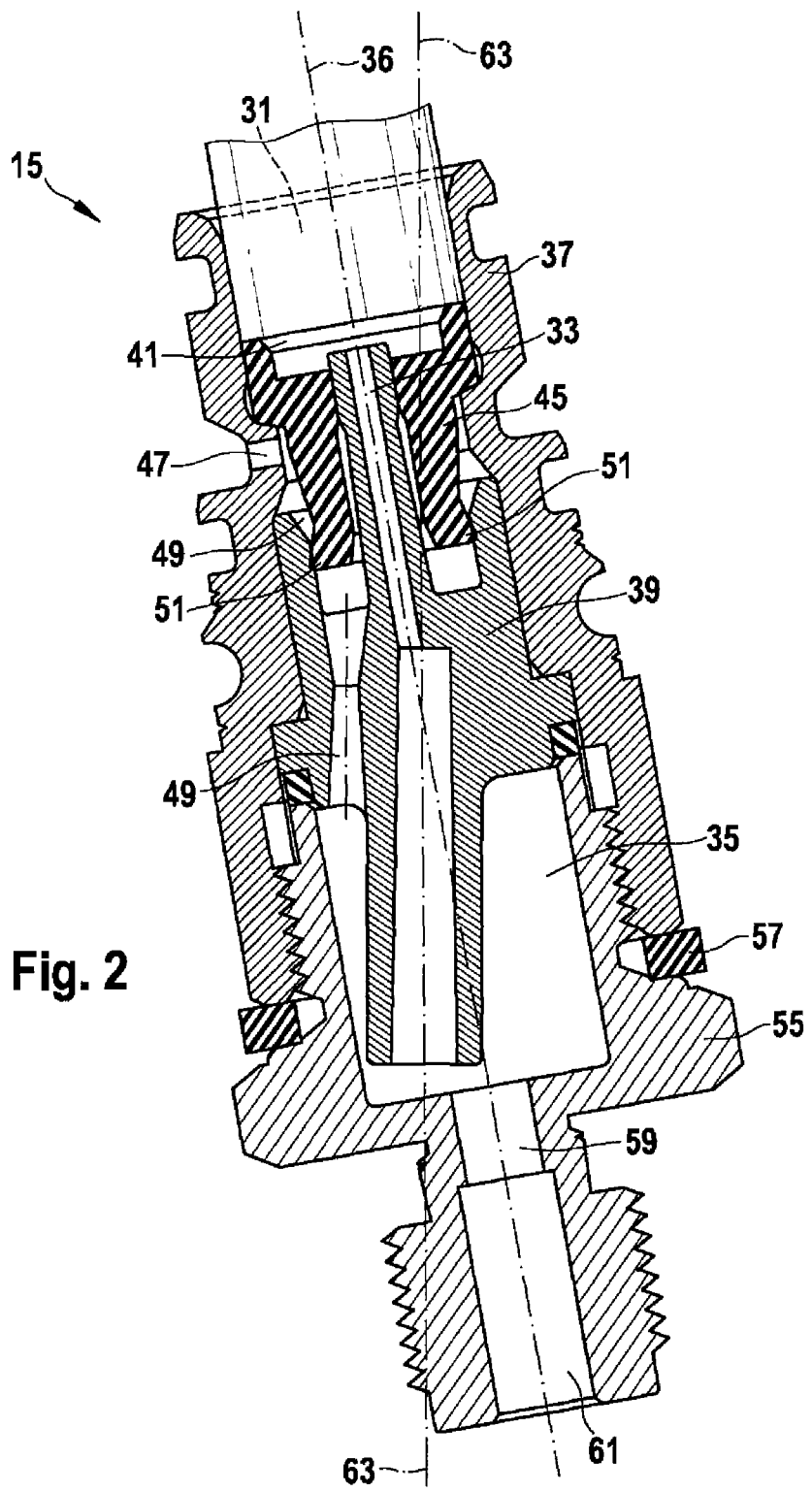
FIG. 2 shows a dosing module according to the invention in a vertical section in a first embodiment.

FIG. 2 shows the dosing module 15 in a first embodiment according to the invention in a longitudinal section. The dosing module 15 according to the invention comprises substantially a dosing valve 31, a guide tube 33 and a mixing chamber 35. The dosing valve 31 is controlled by the control unit 26. Passive, pressure-actuated dosing valves (not illustrated) are however also used. The dosing valve 31 is inserted into a housing 37 of the dosing module 15 from above in FIG. 2. The guide tube 33 initially follows a central axis 36 of the dosing valve 31 until the profile bends to the left in FIG. 2, such that the free end of the guide tube 33 ends close to an inner side wall of the mixing chamber 35. Here, the diameter of the guide tube 33 increases initially abruptly before then also conically opening further in the flow direction. The guide tube 33 is part of a bush 39 and is produced from Teflon or some other fluoroplastic. After the dosing module 15 has been installed into a motor vehicle, the dosing module 15 should preferably be positioned such that a central axis 63 of the angled part of the guide tube 33 runs substantially in the vertical direction.

The guide tube 33 bears against an outlet 41 of the dosing valve. The guide tube 33 or the bush 39 is situated in a central bore of the profiled seal 45 in the housing 37, wherein the guide tube 33 together with a part of the bush 39 projects out of the profiled seal 45 into the mixing chamber 35.

A port 47 for the air pressure line 16 (see FIG. 1) is provided in the region of the profiled seal 45. An air duct 49 for the inflowing compressed air is arranged between the profiled seal 45 and the housing 37. The profiled seal 45 has, at the lower end in FIG. 2, an elastic sealing lip 51 which closes off the air duct 49, that is to say bears against an inner surface of the housing 37. Here, the sealing lip 51 is designed such that the sealing lip 51 has an acute angle counter to a flow direction of the compressed air. In this way, the sealing lip 51 has the function of a check valve. Downstream of the sealing lip 51, the air duct 49 leads onward into the mixing chamber 35. Said region of the air duct 49 is additionally narrowed in the middle.

The housing 37 is closed off in the flow direction by means of a screw connection 55. A sealing ring 57 ensures the required sealing of the connecting point. The screw connection 55 has, in the middle, a bore 59 which constitutes an elongation of the mixing chamber 35 and which opens out, at a lower end in FIG. 2, in a dosing line 61 for the urea-water solution.

The dosing module 15 in the first embodiment (according to FIG. 2) functions as follows:

The urea-water solution is supplied from the storage tank 19 via the dosing pump 18 to the dosing module 15. The dosing valve 31 doses the desired quantity of urea-water solution in the dosing module 15. The injection quantity of urea-water solution passes via the angled guide tube 33 into the left-hand corner of the mixing chamber 35 in FIG. 2. Since the urea-water solution is injected into the guide tube 33 with a pressure of between 1.5 and 5 bar, said urea-water solution is reflected on the base of the mixing chamber 35, and therefore the entire inner surface of the mixing chamber 35 is wetted. In this way, any urea crystals present in the mixing chamber 35 are dissolved again.

At the same time, compressed air is delivered via the pressure line 16 to the port 47 of the dosing module 15. The compressed air passes into the air duct 49, and opens the sealing lip 51 when a defined pressure difference between the air duct 49 and the mixing chamber 35 is exceeded. The compressed air thereby passes into the mixing chamber 35. There, compressed air and reducing agent are mixed and pass into the dosing line 61 and from there into the exhaust pipe 5.

Figure 3:
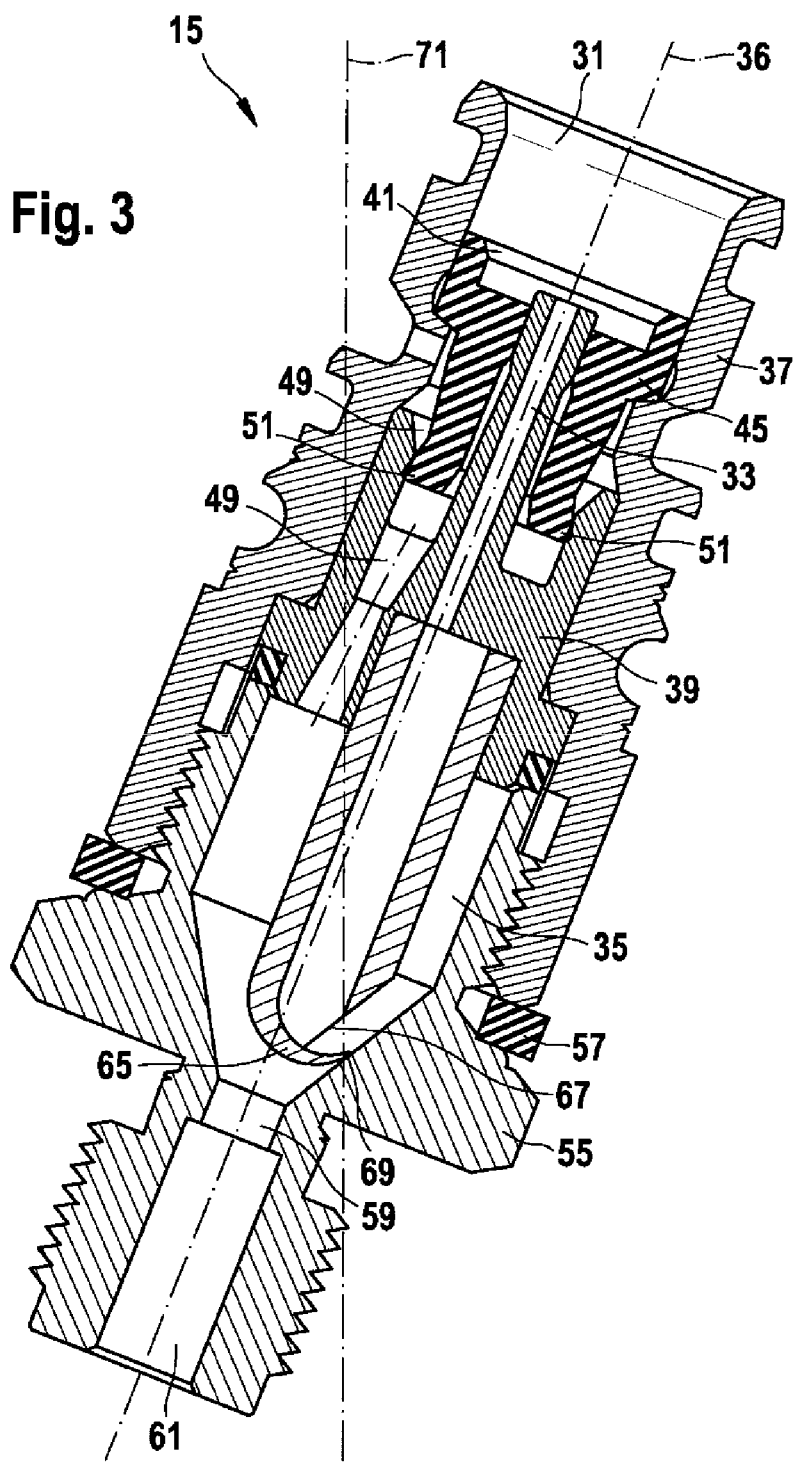
FIG. 3 shows a dosing module according to the invention in a vertical section in a second embodiment.

FIG. 3 shows the dosing module 15 in a second embodiment in a vertical section. Here, and for the subsequent figure, it is the case that elements and regions which are functionally equivalent to elements and regions of the dosing module 15 of FIG. 2 bear the same reference numerals and will not be explained in detail again. The main difference with respect to the dosing module 15 from FIG. 2 is the design and guidance of the guide tube 33, in particular that part of the guide tube 33 which has the outlet opening for the urea-water solution. That region of the guide tube 33 which is directed toward the outlet 41 is of identical design to that in FIG. 2, and as in FIG. 2, is guided in the bush 39. The lower part of the guide tube 33 in FIG. 3 is—in contrast to FIG. 2—enlarged to the left after a step in diameter; the guide tube 33 however runs onward in the same direction. In said region, therefore, there is an asymmetrical arrangement of the lower part of the guide tube 33 in relation to the central axis 36 of the dosing module 15. The guide tube 33 is closed off axially at the free end by a trough-shaped closure 65, but laterally, above the trough-shaped closure 65, has an outlet opening 67 for the urea-water solution. Here, a tip of the trough-shaped closure 65, which tip is designed as a lug 69, bears against a conically tapering inner wall of the mixing chamber 35 within the screw connection 55.

The dosing module 15 in the second embodiment (according to FIG. 3) functions as follows:

The urea-water solution passes into the guide tube 33 via the same path as described in FIG. 2. Here, the urea-water solution flows firstly through the narrow part of the guide tube 33 and subsequently into the wide part of the guide tube 33 until the urea-water solution reaches the trough-shaped closure 65 at the free end of the guide tube 33. There, the urea-water solution is deflected through approximately 120° and subsequently emerges through the outlet opening 67 into the mixing chamber 35. As a result of the deflection of the urea-water solution together with the high speed, the entire inner surface of the mixing chamber 35 is wetted. By means of a preferred oblique installation position of the dosing module 15 in the motor vehicle, it is ensured that the trough-shaped closure 65 is always emptied into the mixing chamber 35 (cf. reference numeral 71). Here, as described with regard to FIG. 2, the urea-water solution is mixed with compressed air. The oblique configuration of the inner wall of the mixing chamber 35 additionally has the effect that all of the urea-water solution which has been enriched with compressed air can finally flow out into the dosing line 61 of the exhaust pipe 5. Here, too, large regions of the mixing chamber 35 are wetted.

Both exemplary embodiments have in common the fact that large parts of the mixing chamber are wetted with liquid reducing agent permanently or at short time intervals, such that the formation of crystals is prevented and any crystals present are dissolved.

Figure 4:
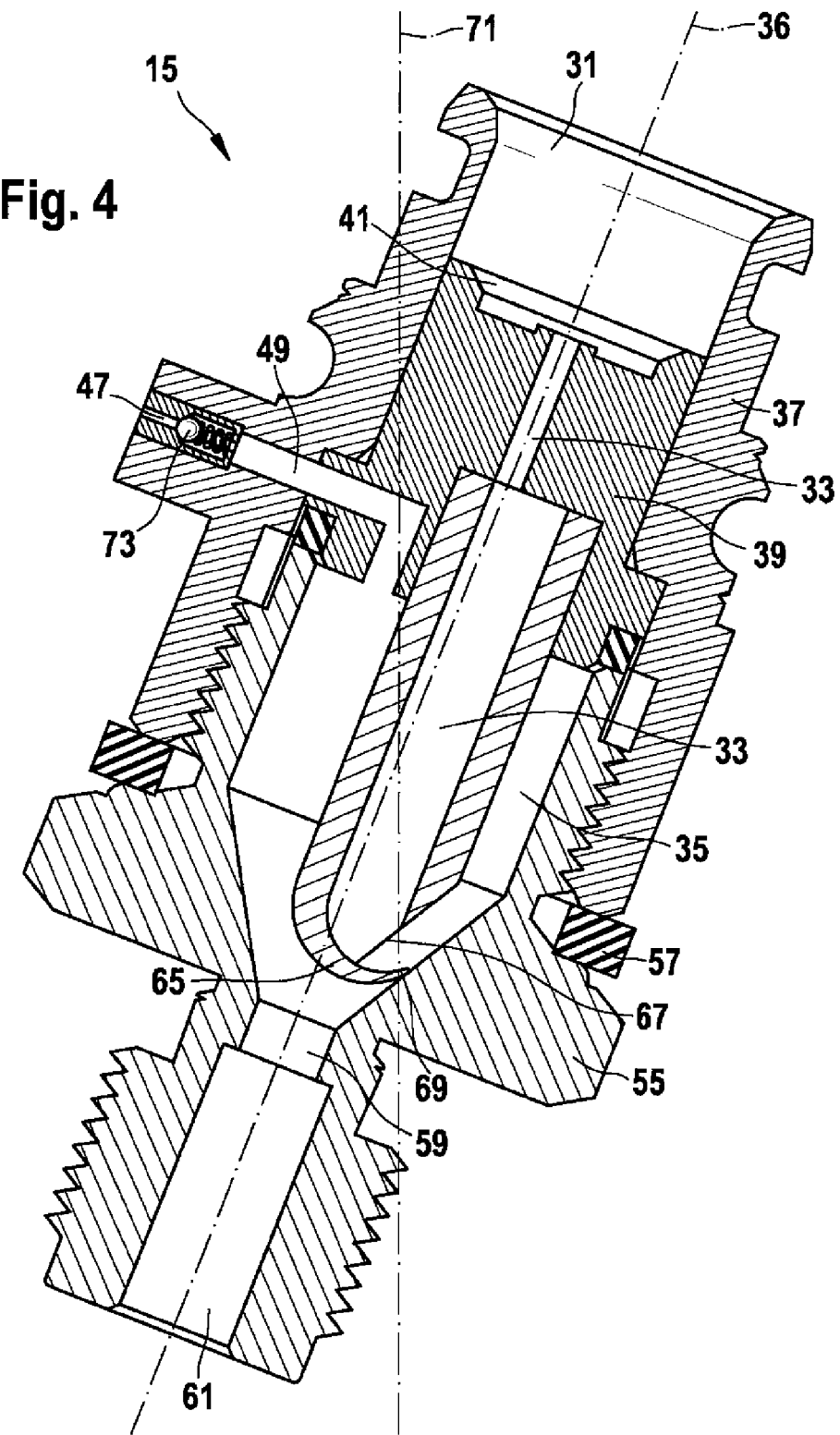
FIG. 4 shows a dosing module according to the invention in a vertical section in a third embodiment.

FIG. 4 shows the dosing module 15 in a third embodiment in a vertical section. In the dosing module 15 illustrated here, it is possible to dispense with the profiled seal 45 because the air duct 49 is offset further in the direction of the dosing line 61, that is to say in the direction of the outlet for the urea-water solution out of the dosing module 15. A check valve 73 is arranged in the air duct 49. As a result of the fact that the profiled seal has been dispensed with, the dosing module 15 has a smaller structural length. The embodiment of FIG. 4 otherwise corresponds to the embodiment of FIG. 3.

The dosing module 15 in the third embodiment (according to FIG. 4) functions as follows:

The urea-water solution passes into the guide tube 33 via the same path as described in FIG. 3, wherein, in FIG. 4, the narrow part of the guide tube 33 is considerably shortened. The urea-water solution subsequently arrives at the trough-shaped closure 65 at the free end of the guide tube 33. Compressed air passes via the compressed-air port 47 into the air duct 49; the check valve 73 arranged in the air duct 49 is open in the air inlet direction. The air/urea-water mixture can now form in the region of the trough-shaped closure 65 up to the dosing line 61. All the further processes are identical to the processes described with regard to FIG. 3. Here, the check valve 73 has the task of preventing an exchange of gases between the interior of the dosing valve 15 and the external compressed-air system (not illustrated) when the system is at a standstill. The check valve 73 otherwise acts in the same way as the sealing lip 51 in the exemplary embodiments in FIGS. 2 and 3. The pressure conditions within the dosing module 15 and the dosing quantity of the dosing module 15 are also unchanged.

What is claimed is:

1. A dosing module (15) for a liquid reducing agent for mixing the reducing agent with a gas and for onward introduction into an exhaust pipe (5) of an internal combustion engine (1), the dosing module (15) comprising a dosing valve (31), a guide tube (33), a compressed-air duct (49) and a mixing chamber (35), characterized in that the guide tube (33)

protrudes into the mixing chamber (35), and an outlet opening of the guide tube (33) for the reducing agent is arranged in the mixing chamber (35) so as to be spaced apart from a central axis (36) of the dosing module (15), wherein a portion of the guide tube (33) that protrudes into the mixing chamber (35) axially closes off the guide tube at a free end and has a lateral outlet opening (67) for the reducing agent.

2. The dosing module (15) as claimed in claim 1, characterized in that the guide tube (33) is angled relative to the central axis (36) of the dosing module (15) at least in the region of an outlet for the reducing agent.

3. The dosing module (15) as claimed in claim 1 characterized in that the lateral outlet opening (67) faces an inner wall of the mixing chamber (35).

4. The dosing module (15) as claimed in claim 1, characterized in that a diameter of the compressed-air duct (49) is smaller than a diameter of the guide tube (33).

5. The dosing module (15) as claimed in claim 4, characterized in that the diameter of the guide tube (33) is larger than the diameter of the compressed-air duct (49) by at least a factor of 1.1.

6. The dosing module (15) as claimed in claim 4, characterized in that the compressed-air duct (49) is narrowed in the middle.

7. The dosing module (15) as claimed in claim 4, characterized in that the compressed-air duct (49) comprises a check valve (73).

8. The dosing module (15) as claimed in claim 7, characterized in that the check valve (73) is a spring-loaded ball valve.

9. The dosing module (15) as claimed in claim 1, characterized in that the mixing chamber (35) is deaerated when a dosing system including the dosing module (15) is switched off.

10. The dosing module (15) as claimed in claim 1, characterized in that the liquid reducing agent is a urea-water solution.

11. The dosing module (15) as claimed in claim 1, characterized in that the gas is air.

12. The dosing module (15) as claimed in claim 1, characterized in that the guide tube (33) is closed off axially at the free end by a trough-shaped closure (65).

\* \* \* \* \*